United States Patent [19]

Rudy

[11] 4,022,584

[45] May 10, 1977

[54] SINTERED CERMETS FOR TOOL AND WEAR APPLICATIONS

[76] Inventor: Erwin Rudy, 15750 NW. Oakhill Drive, Beaverton, Oreg. 97005

[22] Filed: May 11, 1976

[21] Appl. No.: 682,340

[52] U.S. Cl. .................................. 228/122; 75/202; 75/203; 75/206; 51/309 A; 106/73.33; 106/73.4; 228/170; 428/545; 75/234
[51] Int. Cl.$^2$ ..................... B22F 3/00; C22C 29/00
[58] Field of Search ............... 75/202, 203, 206; 29/182.5, 182.7; 106/73.33, 73.4; 51/309

[56] References Cited

UNITED STATES PATENTS

| | | | |
|---|---|---|---|
| 3,457,051 | 7/1969 | Bergna | 75/202 |
| 3,940,276 | 2/1976 | Wilson | 51/309 A |
| 3,953,221 | 4/1976 | Lange | 106/73.4 |

FOREIGN PATENTS OR APPLICATIONS 767,879   2/1957   United Kingdom

*Primary Examiner*—Brooks H. Hunt
*Attorney, Agent, or Firm*—Ronald W. Reagin

[57] ABSTRACT

A composition of material comprising aluminum oxide and refractory transition metal diborides, with additions of magnesium oxide and, optionally, transition metal carbides, nitrides, carbonitrides and iron group metals for sintering and grain morphology control, is disclosed, which is particularly useful as a cutting tool for steels, cast iron, and hard to machine materials, such as superalloys. In contrast to the TiC-Al$_2$O$_3$ cermets of the prior art which have to be hot pressed for optimum properties, a large portion of the cermets of the invention can also be fabricated, without detriment to performance, by sintering the cold pressed powder compacts in an inert furnace atmosphere at temperatures between 1650° and 1820° C.

9 Claims, 4 Drawing Figures

SINTERED CERMETS FOR TOOL AND WEAR APPLICATIONS

The present invention relates to improved aluminum oxide-based cermets and more particularly to improved cermets based on combinations of aluminum oxide and group IV refractory transition metal diborides. These cermets may also contain further alloying additions consisting of transition metal carbides, nitrides, and carbonitrides, and of iron-group metals. The preferred embodiment of the cermets of the invention is one in which the boride is $TiB_2$, the alloying additions are TiC, TiN, and Ti(C,N), and to which small amounts of MgO are added to promote sintering.

Commercial ceramic cutting tool materials are available which are based on aluminum oxide, and which usually contains also small additions of MgO or of other metal oxides to promote sintering. In spite of the superior wear resistance of the ceramic cutting tools when compared with conventional cutting tool materials such as carbides, they have gained only limited acceptance because of their low mechanical and thermal shock resistance, and poor fatigue properties.

Alloying additions of metals and carbides (compare the review article on ceramic cutting tool materials by E. D. Whitney, Powder Metallurgical International, Vol. 6, No. 2, 1974, page 73ff) have resulted in considerable improvements, but only through careful control of amount and nature of alloying ingredients and fabrication variables has it become possible to achieve strength and toughness levels at which such cermets become competitive with conventional tool materials in machining certain materials, in particular cast irons. A serious drawback, however, is their high fabrication cost, since hot pressing is required to achieve optimum performance and the desired tool shapes are formed by sectioning of the hot pressed inserts with diamond wheels and subsequent finish-grinding of the cut shapes into the final tool geometry.

In spite of the attractive properties of transition metal borides, among them high hardness and stability, these compounds have found little practical application to date. The difficulty in using these brittle materials is mainly related to their high reactivity, in particular with the iron group metals, which so far has frustrated attempts to develop cemented borides along the same concepts successfully applied to refractory transition metal carbides. Binderless composites based on TiC-$TiB_2$ (review of related work in R. Kieffer and F. Benesovsky, Hartstoffe und Hartmetalle, Springer, Wein, 1965) and hot pressed TaN-$ZrB_2$ composites (Y. Murata and E. D. Whitney, *Bulletin of the American Ceramic Society*, 48, 1969, p. 698) have at times been proposed for cutting tool applications, but their poor strength and fatigue properties have prevented these cermets from gaining commercial importance.

It is accordingly an object of the present invention to provide an improved composition of material based on aluminum oxide and refractory metal diborides, which have improved strength and thermomechanical fatigue characteristics when compared with commercial ceramics and cermets.

It is another object of the present invention to provide an improved composition of material based on aluminum oxide, refractory metal diborides, and refractory metal carbides and carbonitrides, with improved wear resistance and thermomechanical fatigue characteristics when compared with commercial ceramics and cermets.

It is another object of the present invention to provide such oxide-boride compositions which are stable under vacuum sintering conditions and can thus be also fabricated, without detriment to performance, by conventional powder metallurgical techniques.

It is a further object of the present invention to provide cermets based on aluminum oxide and transition metal diborides, which have sufficient strength and thermal deformation resistance, and the necessary chemical characteristics, so as to provide a machine tool which is particularly useful for machining superalloys at high cutting speeds.

Briefly stated, and in accordance with the present invention, a cermet is provided in which the aluminum oxide content is not less than 48 percent by weight of the composition; the refractory metal diboride comprises from 5 to 50 weight percent of the composition and is selected from the group consisting of $TiB_2$, $ZrB_2$, and $HfB_2$ and may also contain up to 20 weight percent of a diboride of a metal selected from the group consisting of vanadium, niobium, tantalum, chromium, molybdenum, and tungsten, the refractory carbide or carbonitride is based on the group IV (titanium, zirconium, and hafnium), group V (vanadium, niobium, and tantalum), and group VI (chromium, molybdenum and tungsten) refractory transition metals, but preferably those of the group IV metals, and may comprise up to 35 weight percent of the composition; the iron group metals can comprise up to 4 weight percent of the composition; and which contains magnesium oxide additions up to 3 percent by weight of the composition to aid in the sintering of the composition.

For a complete understanding of the present invention, together with an appreciation of its other objects and advantages, please see the following detailed description of the attached drawings in which.

Figure 1:
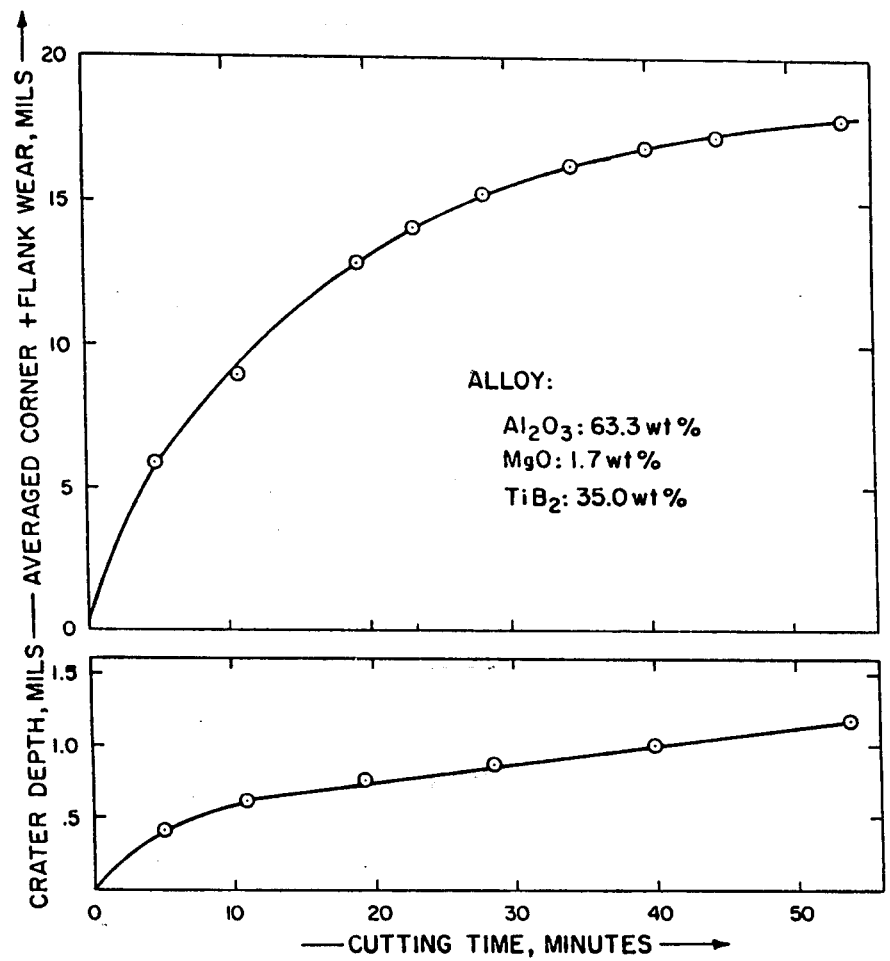
FIG. 1 are flank and crater wear curves of an $Al_2O_3$-$TiB_2$ cermet in machining 4340 steel.

The ingredients used in the preparation of the cermets of the invention are powders of the oxides and the prealloyed borides, carbides, nitrides, and carbonitrides of the transition metals; the iron group metals are added as elemental powders.

Whatever the manner employed in preparing the composition of the cermet, it is important to select conditions which insure a uniform distribution of the constituents in the alloy blend. This applies in particular to the magnesium oxide, the primary purpose of which is to aid sintering and which is present in only comparatively small qunatities in the mixture. A satisfactory distribution of MgO in the alloy blend can be achieved by milling if the grain size of the magnesium oxide ingredient powder is sufficiently small ($<0.2\mu$), but preparation of a prehomogenized oxide blend in a separate is recommended if the powder is to coarse. Preparation of such prehomogenized oxide mixtures can be accomplished by different, well-known, methods, such as thermal decomposition of mixtures consisting of hydrated aluminum sulfate and basic magnesium carbonates, or by hydrolysis of the hydrated nitrates of aluminum and magnesium followed by calcination of the product at temperatures slightly above 1000° C. Another method, which results in particularly homogeneous oxide mixtures, consists in evaporating glycol and citric acid complexed solutions of aluminum and magnesium salts, preferably the nitrates, to form a homogeneous, glassy solid, which then is ignited and heated in air to obtain the pure oxide mixture free of organic and inorganic byproducts.

The carbide powders used in the fabrication of the cermets of the invention were commercial products; the nitrides were prepared by direct combination of the elemental metal powders with nitrogen gas at temperatures between 1200° C and 1700° C; prealloyed carbonitrides of the group IV transition metals were prepared by heating the intimately mixed carbide and nitride ingredient for several hours to temperatures of 2200° to 2400° C under a partial nitrogen atmosphere, while the fabrication procedure for carbonitrides containing group IV and group VI refractory transition metals consisting of nitriding mixtures of group IV metal carbide and group VI metal powders with nitrogen gas at temperatures between 1450° and 1650° C. Substoichiometric carbides and nitrides were prepared from the stoichiometric compounds by addition of the required amount of metal powders and homogenization of the mixture at temperatures between 1800° and 2100° C under vacuum (if the alloying ingredients are carbides) or under inert gas (if the alloying ingredients are nitrides).

Aside from the routine fabrication variables, choice of the ingredients and alloying additions and their grain size distributions, as well as milling (mixing) and sintering conditions, strongly influence microstructure and phase constituents and, as a result, the properties of the sintered cermet.

Although no generally valid guidelines can be given because each individual application has its own special requirements and the fabrication method and parameters to be chosen are dependent on the gross composition as well as the compositions and grain size distributions of the individual ingredients, the following observations, which are based on measured property and performance data of the cermets of the invention, may serve as guidelines for characterizing the cermets falling within the scope of the invention.

The best performing cermets are those in which the oxide and the metallic phase form two continuous interpenetrating lattices, the oxide has a very small grain size, and in which the metallic phase has a dual grain structure, consisting of smaller grains ($<1.5\mu$) and larger grains up to 8 microns in diameter, and constitutes preferably between about 28 and 35 volume percent of the cermet. Among the cermets described in this invention the combinations containing, besides aluminum oxide and magnesium oxide, only the group IV transition metal diborides, in particular $TiB_2$, have the best sintering properties, are stable under vacuum sintering conditions, and also were found to have the highest bending strength values of any of the cermets studied. However, the oxide-boride composites are also prone to rapid grain growth when heated to more than 50° to 70° C above the normal sintering temperatures of 1725° C. At boride levels less than 30 volume percent, excessive grain coarsing can cause disruption of the three-dimensional continuity of the boride lattice, indicated by the loss of electrical conductivity of the cermet and deterioration of the strength levels to less than 60 thousand pounds per square inch (ksi). Discontinuity of the boride skeleton also results in a relief of the compressive stresses on the aluminum oxide phase, and the characteristic fringe pattern, observed along the aluminum oxide grain boundaries in structures with two interpenetrating skeletons under polarized light, is absent in cermets with isolated diboride grains.

Grain growth stability of the alloy phases is significantly improved by additions of carbides and nitrides, but such additions also necessitate higher sintering temperatures and, generally, an inert gas furnace atmosphere during sintering as such additions can cause undesirable interactions with the aluminum oxide under vacuum at temperatures above 1450° to 1500° C. At high concentrations of stoichiometric, or near-stoichiometric, carbides, the pressure-sintering (hot pressing) technique is to be preferred because the lower temperatures required for complete densification aid in diminishing such undesirable interactions between the carbide and the oxide phase.

Lowering of the carbon activity in monocarbides with large homogeneity ranges, such as TiC, by decreasing the carbon content decreases the interaction tendency and also improves the sintering behavior; the properties and performance of such cermets fabricated by cold pressing and sintering under inert gas equaled those fabricated by hot pressing, and generally were superior to tools fabricated from the stoichiometric carbides by either of the two methods. For reasons not yet understood, strength, and performance as tools, of cermets prepared from nitrides with large nitrogen deficiencies were inferior to those fabricated from the stoichiometric or near-stoichiometric compounds.

The following tables and graphs show the performance of a large number of tools having different compositions within the range of the invention, for cermets specially prepared for comparison purposes, and for a prior art $Al_2O_3$-TiC cermet which represents the best of the state of the art ceramic cutting tool materials presently available.

Three different test conditions, one on 4340 steel, one on the superalloy INCONEL 625, and one on the superalloy INCONEL 718, were used. These are designated as Test Condition A, Test Condition B, and Test Condition C. Unless otherwise noted, the test conditions referred to in the tables are as follows:

TEST CONDITION A (Wear and thermomechanical fatigue test)

4340 steel, Rockwell C harness $R_c$ 22 to 29; cutting speed 1000 surface feet per minute; feed rate, 0.0152 inch per revolution; depth of cut, 0.050 inch, no coolant. SNG 433 or SNG 633 inserts, shart cutting edges.

TEST CONDITION B (Superalloy machinability test)

INCONEL 625, solution-treated $R_c$ 29-35; cutting speed, 800 surface feet per minute; feed rate, 0.007 inch per revolution; depth of cut, 0.100 inch, no coolant. SNG 633 inserts, sharp or lightly honed edges (<0.002 inch edge radius).

TEST CONDITION C (Superalloy machinability test)

INCONEL 718, solution-treated, $R_c$ 27 to 32; cutting speed, 800 surface feet per minute; feed rate, 0.007 inch per revolution; depth of cut 0.100 inch, no coolant. SNG 433 or SNG 633 inserts, sharp or lightly hones edges (<0.002 inch edge radius).

The following eight examples which are representative of some of the compositions of the present invention, describe in detail five specific compositions and the manner in which they were fabricated.

EXAMPLE 1

A mixture consisting of 6.400 wt% $Al_2O_3$, 1.00 wt% MgO and 35 wt% $TiB_2$ is thoroughly mixed by ball milling for 30-hours, using naphta or water as milling fluid. The powder slurry is then dried, 6 wt% paraffine added as pressing aid, the mixture homogenized in a blender, and the powder mixture pressed at 3 tones per squre inch into parts. The green compacts are packed in aluminum oxide grit, or stacked on graphite plates coated with $TiB_2$, dewaxed in a 3-hour cycle at 350° C under vacuum, presintered for 1-hour at 1500° C, and sintered to full density during a 1-hour sintering cycle at 1700° to 1730° C in vacuum. The sintered product had a Rockwell A hardness of $R_A \sim 94$, and an average bending strength of 135 ksi.

EXAMPLE 2

The dried powder slurry of the composition described under Example 1 is loaded into graphite dies and hot pressed for 20-minutes at 1600° to 1700° C at a pressure of 3000 psi. The hot pressed part was then shaped into suitable sample geometries by cutting with a diamond wheel. The Rockwell A hardness of the hot pressed cermet was approximately $R_A \sim 94$, and the average bending strength 122 ksi.

EXAMPLE 3

A mixture consisting of 63.50 wt% $Al_2O_3$, 1.50 wt% MgO, 30 wt% $TiB_2$, and 5 wt% TiN was processed in the same manner as described under Example 1 and sintered for 1-hour and 30-minutes at 1720° C under vacuum. The hardness of the sintered cermet was $R_A \sim 93.5$ and the average bending strength 110 ksi.

EXAMPLE 4

A mixture consisting of 60 wt% $Al_2O_3$, 1.70 wt% MgO, 10 wt% $TiB_2$ and 28.3 wt% of carbonitride $(Ti_{.83}Mo_{.17})(C_{.86}N_{.14})_{.91}$ was processed in the same manner as described under Example 1, the dewaxed compacts presintered for 1-hour at 1450° C under vacuum, and sintered for 2-hours at 1810° to 1830° C under a furnace gas atmosphere consisting of 99 vol% helium and 1 vol% nitrogen. The hardness of the sintered cermet was $R_A \sim 93$ and the average bending strength 113 ksi.

EXAMPLE 5

The dried powder slurry of the composition described under Example 4 was hot pressed for 30-minutes at 1800° C in graphite dies and the resulting compact sectioned into suitable shapes. The hardness of the hot pressed cermet was $R_A \sim 92$, and the average bending strength 123 ksi.

EXAMPLE 6

A mixture consisting of 59.40 wt% $Al_2O_3$, 1.60 wt% MgO, 18 wt% $TiB_2$, and 21 wt% $TiC_{.65}$ was processed in the same manner as described under Example 1, the dewaxed compacts presintered for 1-hour at 1350° C under vacuum, and sintered for 2-hours at 1825° C under helium of ambient pressure. The Rockwell hardness of the sintered cermets was $R_A \sim 93.2$, and the average bending strength 126 ksi.

EXAMPLE 7

The dried powder slurry of the composition described under Example 6 was hot pressed for 25-minutes at 1800° C in graphite and the resulting compact sectioned into suitable shapes. The hardness of the hot pressed cermet was $R_A \sim 94$, and the average bending strength 120 ksi.

EXAMPLE 8

A mixture consisting of 43.70 wt% $Al_2O_3$, 1.30 wt% MgO, and 55 wt% $HfB_2$ was processed in the same manner as described under Example 1 and sintered for 1-hour at 1750° C under vacuum. The sintered cermet had a hardness of $R_A \sim 93$ and an average bending strength of 111 ksi.

Test results and performance data for alloy compositions described in these Examples, of other tools in accordance with the invention, and of the prior art $Al_2O_3$-TiC tool when all subject to the test conditions described above, are given in the following Tables 1, 2 and 3, and FIGS. 1, 2, 3 and 4.

FIG. 1 shows the average corner and flank wear and the crater wear as a function of the cutting time of a tool with a gross composition 63.3 wt% $Al_2O_3$, 1.7 wt% MgO, and 35 wt% $TiB_2$ when subjected to Test Condition A.

Figure 2:
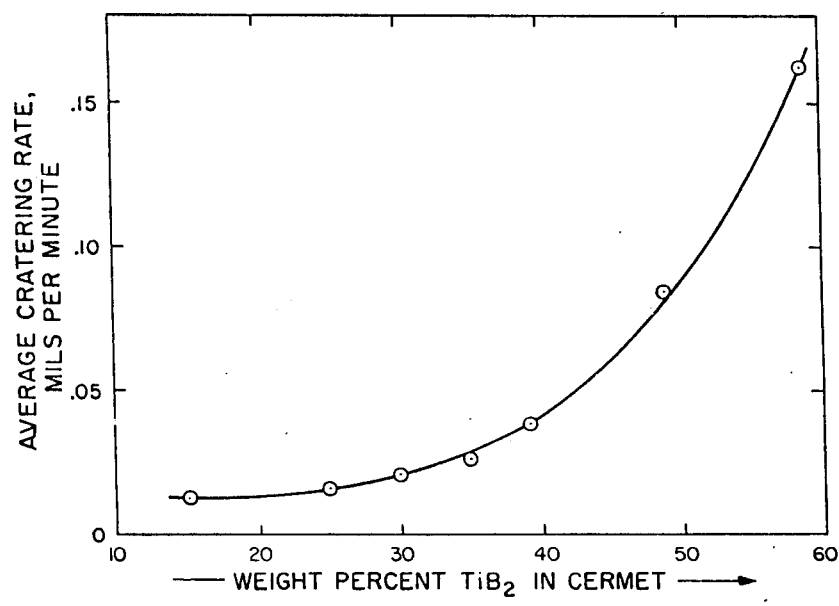
FIG. 2 shows the crater wear of $Al_2O_3$-$TiB_2$ cermets as a function of the $TiB_2$-content in machining 4340 steel.

FIG. 2 shows the average cratering rate of tools prepared from $Al_2O_3$(MgO)-$TiB_2$ cermets as a function of the $TiB_2$ content when subjected to Test Condition A.

Figure 3:
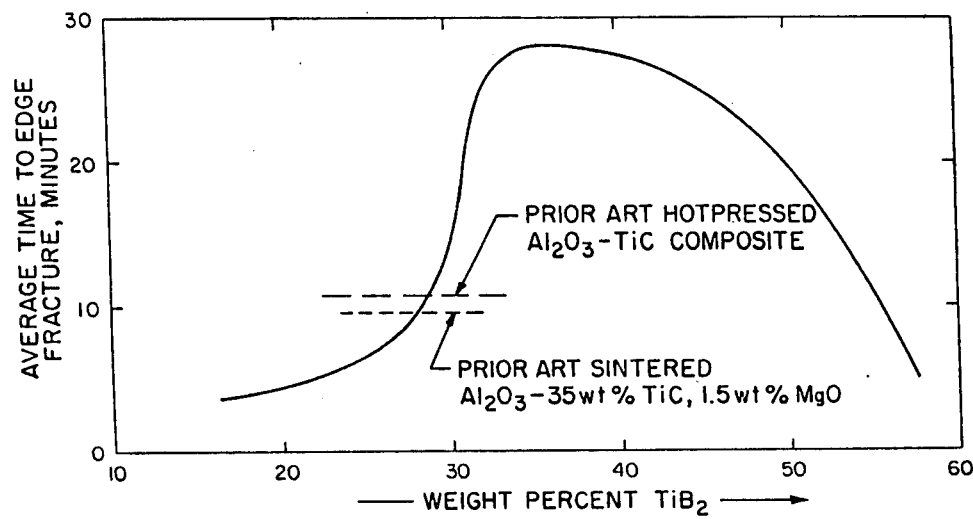
FIG. 3 shows the average cutting time to edge fracture of $Al_2O_3$-$TiB_2$ cermets as a function of the $TiB_2$ content in machining 4340 steel.

FIG. 3 shows the average cutting time to edge fracture (fatigue life) of tools prepared from $Al_2O_3$(MgO)-$TiB_2$ cermets as a function of the $TiB_2$ content, and also shows the cutting time to edge fracture of the prior art and of a cold pressed and sintered prior art $Al_2O_3$-TiC composite, when subjected to Test Condition A.

Table 1

Wear Pattern of the Tools Described in Examples 1 through 8 in Comparison to a Commercial Cermet. Test Condition A.

| Tool | Total Cutting Time, Minutes | Notch at Corner | Corner Wear | Flank Wear | Scale Line | Crater Depth | Remarks |
|---|---|---|---|---|---|---|---|
| Example 1 | 10.57 | — | .008"− | .009" | .009" | .0005" | — |
| " | 30.02 | <.002" | .013" | .015" | .018" | .00083" | — |
| Example 2 | 10.00 | — | .009"+ | .010" | .011" | .0005" | — |
| " | 29.80 | chipped | chipped | .019" | .021" | n.d. | Corner fracture |
| Example 3 | 6.9 | chipped | chipped | .010" | .010" | <.0005" | " |
| Example 4 | 7.1 | chipped | chipped | .008"+ | .009" | <.0005" | Corner fracture |
| Example 5 | 10.17 | — | .007" | .007"+ | .008" | .0045" | — |
| " | 14.30 | chipped | chipped | .009" | .010"− | n.d. | Corner fracture |
| Example 6 | 8.10 | chipped | chipped | .006" | .008" | <.0004" | Corner fracture |
| Example 7 | 10.08 | — | .007" | .007"+ | .008"+ | .0005" | — |
| " | 19.60 | .003" | chipped | .014" | .017" | n.d. | Corner fracture |

Table 1-continued

Wear Pattern of the Tools Described in Examples 1 through 8 in Comparison to a Commercial Cermet. Test Condition A.

| Tool | Total Cutting Time, Minutes | Notch at Corner | Corner Wear | Flank Wear | Scale Line | Crater Depth | Remarks |
|---|---|---|---|---|---|---|---|
| Example 8 | 10.36 | — | .010" | .011" | .013" | .00055" | — |
| " | 17.61 | <.002" | chipped | chipped | .019" | n.d. | Fracture at flank |
| Al$_2$O$_3$-TiC Cermet | 10.11 | — | .007"— | .007"+ | .008" | .0004" | — |
| " | 12.32 | chipped | chipped | .009" | .010" | ~.00055" | Corner fracture |

Table 2

Wear Pattern of the Tools in Examples 1 through 8 and of other Test Tools in Comparison to a Commercial Cermet. Test Condition B.

| Tool | Total Cutting Time, Minutes | Notch at Corner | Corner Wear | Flank Wear | Notch at Scale Line | Edge Wear-back | Crater Depth | Remarks |
|---|---|---|---|---|---|---|---|---|
| Example 1 | 3.78 | .006" | .018" | .036" | .014" | .002" | .0021" | — |
| Example 2 | 3.93 | .009" | .022" | .044" | .019" | .002" | (.002") | — |
| Example 3 | 3.25 | .012" | .008" | .016" | .038" | .001" | .0017" | — |
| Example 4 | 3.17 | .016" | .018" | .023" | .050" | .001" | .0015" | — |
| Example 5 | 3.63 | .010" | .009" | .016" | .026" | .0015" | .002" | — |
| Example 6 | 3.34 | .010" | .012" | .022" | .032" | .002" | (.002") | — |
| Example 7 | 4.01 | .008" | .021" | .032" | .042" | .002" | .0022" | — |
| Example 8 | 3.43 | .016" chip | .024" | .044" | .016" | .0022" | .002" | — |
| Tool A | 4.33 | .008" | .011" | .016" | .031" | .0027" | (.0027") | — |
| Tool B | 4.16 | .006" | .020" | .040" | .036" | .0025" | (.0025") | — |
| Tool C | 4.47 | .006" | .022" | .036" | .024" | .002" | (.002") | — |
| Al$_2$O$_3$-TiC Cermet | 1.41 | .006" | .004" | .012" | .016" | — | .0008" | Crack at scale line |
| " | 1.43 | .006" | chipped | | | — | — | Flank broke down |

Tool A: Example 3, pressure-sintered
Tool B: 69 Al$_2$O$_3$, 1.0 MgO, 30 TiB$_2$, vacuum-sintered
Tool C: 72 Al$_2$O$_3$, MgO, 27 TiB$_2$, vacuum-sintered

Table 3

Wear Pattern of the Tools in Examples 1 through 8. Test Condition C

| Tool | Total Cutting Time, Minutes | Notch at Corner | Corner Wear | Flank Wear | Notch at Scale Line | Edge Wear-back | Crater Depth | Remarks |
|---|---|---|---|---|---|---|---|---|
| Example 1 | 3.46 | .012" | .010" | .016" | .013" | — | <.001 | Uneven edge wear |
| Example 3 | 3.25 | .020" chip | .008" | .016" | .075" | — | <.001 | " |
| Example 5 | 2.86 | .012" | .012" | .010" | .060" | — | <.001 | Rough wearland at corner |
| Example 7 | 2.35 | .050" | .010" | .010" | .042" | — | <.001 | Severe notching at corner |

Figure 4:
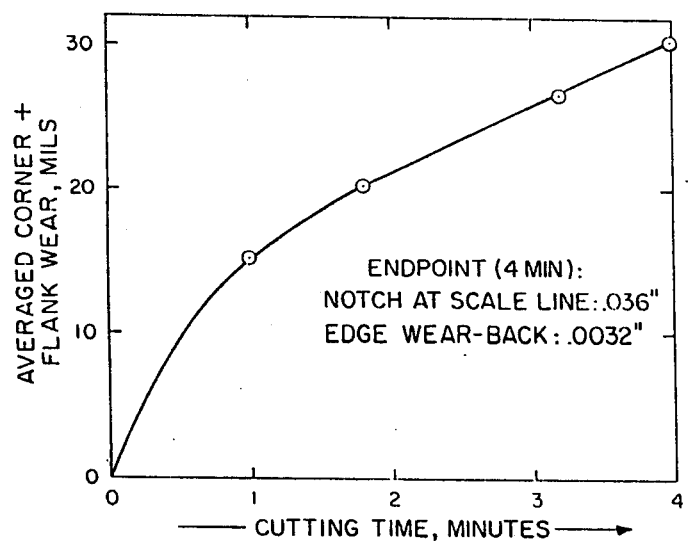
FIG. 4 is a wear curve for a cermet composed of 69 wt% $Al_2O_3$, 1 wt% MgO, and 30 wt% $TiB_2$ in machining INCONEL 625.

FIG. 4 shows the averaged crater and flank wear of a tool with a gross composition of 69 wt% Al$_2$O$_3$, 1 wt% MgO, and 30 wt% TiB$_2$ as a function of the cutting time in machining INCONEL 625 under the following conditions: Cutting speed, 1000 surface feet per minute; feed rate, 0.0051 inch per revolution; depth of cut, 0.100 inch; no coolant. Tool geometry SNG 433, sharp edges.

It is seen from the curves of FIGS. 3 through 6 and Tables 1 through 3 that the tools within the range of the present invention have superior fatigue life in machining steels when compared to ceramic tools designed for similar applications, the cratering rates are about equal to those measured for the commercial tool, while the flank wear rates, in the average, are slightly higher during the wear-in period of the tools. The good performance on the superalloys at high metal removal rates, and without coolant, is indicative of the high edge strength and thermal deformation resistance of the cermets of the invention. It is further thought that boric acid, formed by surface oxidation of the boride component in the cermet during the machining operation, serves as a lubricant between tool and workpiece and therefore is a contributing factor in the good performance of these tool materials in machining the superalloys at high cutting speeds.

The following Tables 4 and 5 contain test data for a number of tools prepared from specific compositions in accordance with the present invention when subjected to Test Condition A. When examining the data it will be appreciated that many of the alloys listed in Tables 4 and 5, even when fabricated under optimum conditions, are outside the composition ranges considered competitive with existing tool materials in the envisioned area of application, but have been included to outline more clearly the useful composition boundaries of the alloys of the invention. Table 6 contains test data from tools fabricated from boride-free composites for composition purposes, when subjected to Test Condition A.

Table 4.

Selected List of Oxide-Boride Cermets (Tool Life Data for Test Condition A)

| Gross Composition of Cermet, wt. % | Fabrication Method(*) | Average Cutting Time to Edge Fracture, Minutes | Remarks |
|---|---|---|---|
| 84.5 Al$_2$O$_3$, 0.5 MgO, 15 TiB$_2$ | Vac | 4.6 | trace-porosity |
| " | PS | 4.3 | coarse TiB$_2$ |
| " | Gas | 2.3 | light porosity, coarse |
| 84.0 Al$_2$O$_3$, 1.00 MgO, 15 TiB$_2$ | Vac | 6.0 | — |

Table 4.-continued

Selected List of Oxide-Boride Cermets (Tool Life Data for Test Condition A)

| Gross Composition of Cermet, wt. % | Fabrication Method(*) | Average Cutting Time to Edge Fracture, Minutes | Remarks |
|---|---|---|---|
| " | PS | 6.0 | — |
| " | Gas | 4.6 | trace porosity |
| 83.5 $Al_2O_3$, 1.5 MgO, 15$TiB_2$ | Vac | 7.3 | — |
| " | PS | 6.6 | — |
| " | Gas | 4.2 | — |
| 79.5 $Al_2O_3$, 0.5 MgO, 20 $TiB_2$ | Vac | 6.6 | — |
| " | PS | 5.0 | coarse grain |
| " | Gas | 2.4 | " |
| 79.0 $Al_2O_3$, 1.0 MgO, 20 $TiB_2$ | Vac | 9.5 | — |
| " | PS | 9.0 | — |
| " | Gas | 6.6 | — |
| 78.5 $Al_2O_3$, 1.5 MgO, 20 $TiB_2$ | Vac | 9.3 | — |
| " | PS | 10.0 | — |
| " | Gas | 5.6 | coarse grain |
| 78.0 $Al_2O_3$, 2.0 MgO, 20 $TiB_2$ | Vac | 8.0 | — |
| " | PS | 7.0 | — |
| " | Gas | 4.3 | coarse grain |
| 74.5 $Al_2O_3$, 0.5 MgO, 25 $TiB_2$ | Vac | 7.5 | — |
| " | PS | 6.2 | coarse grain |
| " | Gas | 6.6 | coarse grain |
| 69.5 $Al_2O_3$, 0.5 MgO, 30 $TiB_2$ | Vac | 14 | — |
| " | PS | 17 | — |
| " | Gas | 9 | slight porosity |
| 69.0 $Al_2O_3$, 1.0 MgO, 30 $TiB_2$ | Vac | 22 | — |
| " | PS | 14 | coarser grain |
| " | Gas | 12 | — |
| 68.5 $Al_2O_3$, 1.5 MgO, 30 $TiB_2$ | Vac | 26 | — |
| " | PS | 16 | coarser grain |
| " | Gas | 19 | — |
| 68.0 $Al_2O_3$, 20 MgO, 30 $TiB_2$ | Vac | 18 | — |
| " | PS | 15 | — |
| " | Gas | 19 | — |
| 67.0 $Al_2O_3$, 3.0 MgO, 30 $TiB_2$ | Vac | 18 | — |
| " | PS | 14 | — |
| " | Gas | 16 | — |
| 65.0 $Al_2O_3$, 5.0 MgO, 30 $TiB_2$ | Vac | 13 | — |
| " | PS | 8.8 | — |
| " | Gas | 11 | — |
| 65.0 $Al_2O_3$, 5.0 TiO, 30 $TiB_2$ | Vac | not tested | porosity |
| " | PS | 5.6 | — |
| " | Gas | not tested | porosity |
| 65.5 $Al_2O_3$, 0.5 MgO, 35 $TiB_2$ | Vac | 11 | light porosity |
| " | PS | 31 | — |
| " | Gas | 9.6 | light porosity |
| 64.0 $Al_2O_3$, 1.0 MgO, 35 $TiB_2$ | Vac | >30 | not tested to destruction |
| " | PS | 30 | — |
| " | Gas | 16 | coarse grain |
| 63.5 $Al_2O_3$, 1.5 MgO, 35 $TiB_2$ | Vac | 48 | — |
| " | PS | 34 | — |
| " | Gas | 11 | Coarse grain |
| 63.0 $Al_2O_3$, 2.0 MgO, 35 $TiB_2$ | Vac | 35 | — |
| " | PS | 41 | — |
| " | Gas | 14 | coarse grain |
| 61.5 $Al_2O_3$, 0.5 MgO, 38 $TiB_2$ | Vac | 46 | not tested to destruction |
| " | PS | 6 | light porosity |
| 61.0 $Al_2O_3$, 1.0 MgO, 38 $TiB_2$ | Vac | 43 | — |
| " | PS | 18 | coarse grain |
| 60.5 $Al_2O_3$, 1.5 MgO, 38 $TiB_2$ | Vac | 35 | — |
| " | PS | 29 | — |
| 60.0 $Al_2O_3$, 2 MgO, 38 $TiB_2$ | Vac | 33 | — |
| " | PS | 36 | — |
| 66.5 $Al_2O_3$, 0.5 MgO, 43 $TiB_2$ | Vac | 26 | — |
| " | PS | 26 | — |
| 66.0 $Al_2O_3$, 1.0 MgO, 43 $TiB_2$ | Vac | 29 | — |
| " | PS | 26 | — |
| 65.5 $Al_2O_3$, 1.5 MgO, 43 $TiB_2$ | Vac | 37 | — |
| " | PS | 16 | coarse grain |
| 49.5 $Al_2O_3$, 0.5 MgO, 50 $TiB_2$ | Vac | 19 | — |
| 49.0 MgO, 1.0 MgO, 50 $TiB_2$ | Vac | 26 | — |
| " | PS | 19 | — |
| 48.5 MgO, 1.5 MgO, 50 $TiB_2$ | Vac | 23 | — |
| 39.5 $Al_2O_3$, 0.5 MgO, 60 $TiB_2$ | Vac | 8.6 | — |
| 39.0 $Al_2O_3$, 1.0 MgO, 60 $TiB_2$ | Vac | 4.9 | — |
| 24.5 $Al_2O_3$, 0.5 MgO, 75 $TiB_2$ | Vac | 2.9 | — |
| " | PS | 1.4 | light porosity |
| 24 $Al_2O_3$, 1.0 MgO, 75 $TiB_2$ | Vac | 3.6 | — |
| " | PS | 1.9 | trace porosity |
| 65.0 $Al_2O_3$, 1.0 MgO, 34 $ZrB_2$ | Vac | 9.4 | — |
| " | PS | 4.6 | porosity |
| 64.5 $Al_2O_3$, 1.5 MgO, 34 $ZrB_2$ | Vac | 8.4 | — |
| " | PS | 3.6 | trace porosity |
| 51.0 $Al_2O_3$, 1.0 MgO, 48 $HfB_2$ | Vac | 12 | — |
| " | PS | 13 | — |
| 39.5 $Al_2O_3$, 0.5 MgO, 60 $HfB_2$ | Vac | 21 | — |
| " | PS | 16 | — |
| 63.5 $Al_2O_3$, 1.5 MgO, 35 $VB_2$ | Vac | 1.4 | porous |
| " | PS | 6.6 | — |

Table 4.-continued

Selected List of Oxide-Boride Cermets (Tool Life Data for Test Condition A)

| Gross Composition of Cermet, wt. % | Fabrication Method(*) | Average Cutting Time to Edge Fracture, Minutes | Remarks |
|---|---|---|---|
| 55.7 $Al_2O_3$, 1.3 MgO, 43 $VB_2$ | Vac | 1.9 | porous |
| 59.0 $Al_2O_3$, 1.0 MgO, 40 $NbB_2$ | Vac | 3.2 | light porosity |
| 58.5 $Al_2O_3$, 1.5 MgO, 40 $NbB_2$ | Vac | 2.6 | light porosity, coarse grain |
| 49.0 $Al_2O_3$, 1.0 MgO, 50 $NbB_2$ | Vac | 1.4 | light porosity, coarse grain |
| 48.5 $Al_2O_3$, 1.5 MgO, 50 $NbB_2$ | Vac | not tested | very porous |
| 44.0 $Al_2O_3$, 1.0 MgO, 55 $TaB_2$ | Vac | 3.2 | coarse grain |
| 34.0 $Al_2O_3$, 1.0 MgO, 65 $TaB_2$ | Vac | 1.4 | porous, coarse grain |
| " | PS | 6.4 | — |
| 64.0 $Al_2O_3$, 1.0 MgO, 35 $CrB_2$ | Vac | not tested | very porous |
| " | PS | 5.8 | — |
| 54.0 $Al_2O_3$, 1.0 MgO, 45 $CrB_2$ | Vac | not tested | very porous |
| " | PS | 4.2 | — |
| 44.0 $Al_2O_3$, 1.0 MgO, 55 $MoB_2$ | Vac | 1.9 | porous |
| " | PS | 3.8 | — |
| 50.0 $Al_2O_3$, 1.0 MgO, 25 $TiB_2$, 24 $HfB_2$ | Vac | 23 | — |
| 64.0 $Al_2O_3$, 1.0 MgO, 25 $TiB_2$, 10 $CrB_2$ | PS | 21 | — |
| 60.0 $Al_2O_3$, 1.0 MgO, 25 $TiB_2$, 14 $ZrB_2$ | Vac | 18 | — |
| 64.0 $Al_2O_3$, 1.0 MgO, 25 $TiB_2$, 10 $VB_2$ | PS | 19 | — |
| 44.0 $Al_2O_3$, 1.0 MgO, 40 $HfB_2$, 15 $CrB_2$ | Vac | not tested | porous |
| " | PS | 22 | — |
| 44.0 $Al_2O_3$, 1.0 MgO, 42 $HfB_2$, 13 $NbB_2$ | Vac | 4.4 | porous |
| " | PS | 17 | — |

(*)Vac = Vacuum sintered, 1650° to 1730° C
PS = Pressure sintered, 1600° to 1780° C
Gas = Sintered under a noble gas atmosphere of ambient pressure Table 5.

Selected List of Oxide-Boride Cermets with Alloying Additions
(Tool Life Data for Test Condition A)

| Gross Composition of Cermet, wt.% | Fabrication Method(*) | Average Cutting Time to Edge Fracture, Minutes | Remarks |
|---|---|---|---|
| 64.0 $Al_2O_3$, 1.0 MgO, 30 $TiB_2$, 5 TiN | Vac | 6.9 | light porosity |
| " | PS | 27 | — |
| " | Gas | 21 | — |
| 64.0 $Al_2O_3$, 1.0 MgO, 25 $TiB_2$, 10 $TiN_{.67}$ | Vac | 5.6 | — |
| " | PS | 7.3 | — |
| " | Gas | 6.9 | — |
| 62.4 $Al_2O_3$, 1.6 MgO, 18 $TiB_2$, 18 TiN | Vac | 3.2 | light porosity |
| " | Gas | 8.9 | — |
| 59.5 $Al_2O_3$, 0.5 MgO, 10 $TiB_2$, 30 TiN | Vac | 4.4 | — |
| " | Gas | 8.2 | — |
| 59.5 $Al_2O_3$, 0.5 MgO, 29 $TiB_2$, 11 TiN | Vac | 2.2 | light porosity |
| " | Gas | 2.9 | light porosity |
| 50 $Al_2O_3$, 1.50 MgO, 24.25 $TiB_2$, 24.25 $Ti(N_{.5}N_{.5})$ | Gas | 6.6 | high surface porosity |
| " | PS | 9.6 | — |
| 62.5 $Al_2O_3$, 1.5 MgO, 18 $TiB_2$, 18 $Ti(C_{.5}N_{.5})_{.8}$ | Gas | 4.3 | high surface porosity |
| " | PS | 11 | — |
| 64.0 $Al_2O_3$, 1.0 MgO, 30 $TiB_2$, 5 $TiC_{.55}$ | Vac | 8.7 | trace porosity |
| " | PS | 32 | — |
| " | Gas | 28 | — |
| 64.0 $Al_2O_3$, 1.0 MgO, 25 $TiB_2$, 10 $TiC_{.92}$ | Vac | <.1 | very porous |
| " | PS | 24 | — |
| " | Gas | 27 | — |
| 64.0 $Al_2O_3$, 1.0 MgO, 20 $TiB_2$, 15 $TiC_{.90}$ | Vac | <.1 | very porous |
| " | PS | 22 | — |
| " | Gas | 20 | — |
| 64.0 $Al_2O_3$, 1.0 MgO, 10 $TiB_2$, 35 TiC | Gas | 3.9 | light porosity |
| " | PS | 7 | — |
| 59.5 $Al_2O_3$, 0.5 MgO, 29 $TiB_2$, 11 TiC | Gas | 16 | — |
| " | PS | 6 | coarse grain |
| 60.7 $Al_2O_3$, 1.3 MgO, 24 $TiB_2$, 14 $(Ti_{.83}Mo_{.17})(C_{.86}N_{.14})_{.91}$ | Gas | 23 | — |
| " | PS | 5.5 | coarse grain |
| 40.0 $Al_2O_3$, 1 MgO, 49 $HfB_2$, 11 TiN | Vac | 6.9 | — |
| " | PS | 17 | — |
| " | Gas | 19 | — |
| 40 $Al_2O_3$, 1 MgO, 49 $HfB_2$, 11 $TiC_{.92}$ | Gas | <.3 | porous |
| " | PS | 16 | — |
| 62.5 $Al_2O_3$, 30 $TiB_2$, 6 Ni, 1.5 Mo | Vac | 17 | final failure by wear |
| 57.5 $Al_2O_3$, 20 $TiB_2$, 6 Ni, 15 TiN, 1.5 Mo | Vac | 7.9 | light porosity |
| " | Gas | 6.1 | " |
| 57.5 $Al_2O_3$, 20 $TiB_2$, 6 Ni, 15 TiC, 1.5 Mo | Vac | 14 | — |
| " | Gas | 3 | light porosity |
| 63 $Al_2O_3$, 33 $TiB_2$, 4 Fe | Vac | 19 | final failure by wear |
| " | Gas | 6.9 | light porosity |
| 62 $Al_2O_3$, 32 $TiB_2$, 6 WC | Vac | 21 | — |
| " | Gas | 9 | coarse grain |

(*)Legend, see Table

Table 6

Selected List of Boride-free Cermets Fabricated for Comparison Purposes
(Tool Life Data for Test Condition A).

| Gross Composition of Cermet, wt.% | Fabrication Method(*) | Average Cutting Time to Edge Fracture, Minutes | Remarks |
|---|---|---|---|
| 78.5 $Al_2O_3$, 1.5 MgO, 20 TiC | Gas | 5.8 | — |
| " | PS | 7.6 | — |
| 64.0 $Al_2O_3$, 0.5 MgO, 35.5 TiC | Gas | 4.6 | light porosity |
| " | PS | 10.6 | — |
| 64.0 $Al_2O_3$, 1.0 MgO, 35 $TiC_{.92}$ | Gas | 10.2 | — |
| " | PS | 11.2 | — |
| 63.5 $Al_2O_3$, 1.5 MgO, 35 TiC | Gas | 8.1 | — |
| " | PS | 10.8 | — |
| 59.5 $Al_2O_3$, 0.5 MgO, 40 TiC | Gas | 4.4 | light porosity |
| " | PS | 8.6 | — |
| 58.5 $Al_2O_3$, 1.5 MgO, 40 TiC | Gas | 9.1 | — |
| " | PS | 6.4 | coarse grain |
| 63.0 $Al_2O_3$, 1.7 MgO, 35.3 TiN | Vac | 5.4 | — |
| " | PS | 9.4 | — |
| " | Gas | 8.9 | — |
| 50.0 $Al_2O_3$, 1.5 MgO, 48.5 TiN | Vac | not tested | — |
| " | PS | 7.6 | — |
| " | Gas | 6.3 | — |
| 68.7 $Al_2O_3$, 30.3 TiN | PS | 14 | edge chamfered |
| 66.2 $Al_2O_3$, 2 Ni, 0.5 Mo, 30.3 TiN | PS | not tested | porous, coarse grain |
| 70 $Al_2O_3$, 30 $Ti(C_{.5}N_{.5})$ | PS | 9.9 | — |
| 63.5 $Al_2O_3$, 2 Ni, 0.5 Mo, $34(Ti_{.83}Mo_{.17})(C_{.86}N_{.14})_{.9}$ | PS | .9 | porous |
| 60 $Al_2O_3$, 1.5 MgO, 38.5 $(Ti_{.83}Mo_{.17})(C_{.86}N_{.14})_{.91}$ | Gas | 13.2 | — |
| " | PS | 6.7 | coarse grain |
| 50 $Al_2O_3$, 1.5 MgO, 48.5 $(Ti_{.83}Mo_{.17})(C_{.86}N_{.14})_{.91}$ | Gas | 10.1 | — |
| " | PS | 8.6 | — |
| 60 $Al_2O_3$, 1.5 MgO, 38.5 $(Ti_{.75}Mo_{.25})(C_{.80}N_{.20})_{.90}$ | Gas | 6.2 | — |
| " | PS | 10.2 | — |
| 60 $Al_2O_3$, 1.5 MgO, 38.5 $(Ti_{.7}Mo_{.3})(C_{.82}N_{.18})_{.85}$ | Gas | 1.9 | — |
| " | PS | 3.6 | — |
| 63.5 $Al_2O_3$, 1.5 MgO, 35 $(Ti_{.8}Mo_{.1}Cr_{.1})(C_{.8}N_{.2})$ | Gas | 8.0 | — |
| " | PS | 4.1 | coarse grain |
| 68 $Al_2O_3$, 32 $Ti(N_{.75}O_{.25})$ | PS | 2 | fine cracks throughout tool |
| 68 $Al_2O_3$, 32 $Ti(C_{.75}O_{.25})$ | PS | 2 | " |
| 45 $Al_2O_3$, 0.5 MgO, 54.5 HfC | PS | 7.5 | — |
| 44.5 $Al_2O_3$, 0.5 MgO, 55 HfN | PS | not tested | porous |
| 46.5 $Al_2O_3$, 0.5 MgO, 53 $Hf(C_{.5}N_{.5})$ | PS | 4 | — |
| 54.5 $Al_2O_3$, 0.5 MgO, 45 $(Hf_{.75}Ti_{.25})(N_{.75}O_{.25})$ | PS | not tested | fine cracks throughout tool |
| 60 $Al_2O_3$, 40 ZrN | PS | 4.4 | — |
| 60 $Al_2O_3$, 40 $(Zr_{.75}Ti_{.25})(N_{.75}O_{.25})$ | PS | 9.1 | — |
| 64 $Al_2O_3$, 36 $(Ti_{.5}Nb_{.5})N$ | PS | 11 | — |
| 65 $Al_2O_3$, 35 $(Ti_{.5}V_{.5})N$ | PS | 6.8 | — |
| 67 $Al_2O_3$, 33 $(Ti_{.75}Nb_{.25})(N_{.75}O_{.25})$ | PS | 10.5 | — |
| 65 $Al_2O_3$, 0.5 MgO, 34.5 $(Ti_{.82}Cr_{.18})(C_{.82}N_{.18})$ | PS | 7.5 | — |
| 65 $Al_2O_3$, 35 $(Ti_{.78}Cr_{.22})(C_{.78}N_{.22})$ | PS | 5.5 | — |
| 65 $Al_2O_3$, 35 $(Ti_{.65}Cr_{.35})(C_{.65}N_{.35})$ | PS | 5.0 | — |
| 50 $Al_2O_3$, 50 $(Ti_{.78}Cr_{.22})(C_{.78}N_{.22})$ | PS | 7.0 | — |
| 29 $Al_2O_3$, 71 $(Ti_{.78}Cr_{.22})(C_{.78}N_{.22})$ | PS | 6.6 | — |
| 80 TiC, 20 $TiB_2$ | Gas | 1.6 | breakdown at scale line |
| 80 TiN, 20 $TiB_2$ | Gas | 2.3 | " |
| Commercial $Al_2O_3$-TiC Cermet | (PS) | 12 | chamfered edges reground to sharp edges |

(*) For legend, see Table

The following paragraphs summarize the effects of different alloying additions on fabricability, properties, and performance of the cermets of the invention.

1. Additions of MgO improve sinterability of the compositions of the invention, but high levels tend to increase the notching tendency of the tools. The optimum concentrations of MgO are approximately 0.2 to 0.6 percent by weight of the amount of $Al_2O_3$ for cermets to be fabricated by pressure-sintering, and between 1 and 2wt% of the amount of alumina for materials prepared by cold pressing and sintering.

2. Wear and cratering resistance of the tools decrease with increasing boride content. Cermets containing the group IV refractory transition metal borides show the best performance, although the presence of smaller amounts, generally less than 20% of the weight of the group IV metal diboride, of other refractory transition metal diborides can be tolerated without significant changes in performance. Use of borides containing only group V and group VI metal as boride component in the alloy formulations is not recommended, because of poor sintering and strength properties of such compositions. Vaporization of the metal component of cermets containing high concentrations of $VB_2$ and $CrB_2$ during vacuum sintering usually results in high porosity and such compositions are therefore preferably fabricated by pressure-sintering.

3. Additions of carbides, nitrides, and carbonitrides, have a very pronounced effect on grain growth stability of the alloys but increase the sintering temperatures required for complete densification and, particularly in the case of carbides, require use of an inert gas sintering atmosphere. Among the available transition metal compounds, the carbides, carbonitrides, and nitrides of the group IV transition metals, which may be alloyed with smaller amounts of group V and group VI transition metals, are the preferred choice. Cermets containing substantial amounts of ZrN and HfN are difficult to sinter to full density and are therefore preferably fabricated by pressure-sintering.

4. Addition of smaller amounts (<4 wt%) of ferrous metals, optionally alloyed with smaller amounts of refractory transition metals such as molybdenum, tungsten and chromium, permit a 50° C to 75° C lowering of the sintering temperature of boride-containing cermets. Tools prepared from ferrous metal-alloyed cermets show good fatigue life but are less wear resistant than the iron metal free grades.

Additions of ferrous metals to cermet compositions which contain a high proportion of carbides, nitrides, or carbonitrides, are only possible if the compositions are to be sintered under pressure; when heating cold pressed parts of such compositions to sintering temperature, the ferrous alloy tends to migrate to the part surfaces, with the interiors of the sintered parts remaining porous.

5. Composite tools consisting of a laminate of a tough carbide substrate and a thin layer (<0.7 mm) of a cermet can be used with advantage to decrease gross fracture sensitivity of the cermets in machining applications. A suitable procedure for forming the composite tool consists of electroplating a thin as-sintered, or preground, cermet plate with nickel and brazing the coated plate to the carbide substrate with a Cu-Ni-Ti alloy. Wear performance of composite tools prepared in this manner were found to be equivalent to that of solid cermet tools.

The data shown in the above Tables and graphs are representative of many other alloys within the range of the invention which were prepared and tested. It becomes evident from a comparison of the performance data that the new compositions of the present invention offer a substantial improvement in overall performance of the state of the art tools in machining steels and are particularly useful for machining superalloys at high metal removal rates.

While the invention is thus disclosed and many embodiments described in detail, it is not intended that the invention be limited to those shown embodiments. Instead, many embodiments and uses will occur to those skilled in the art which fall within the spirit and scope of the invention. It is intended that the invention be limited only by the appended claims.

What is claimed is:

1. A composition of material consisting essentially of aluminum oxide, magnesium oxide, refractory transition metal diborides, refractory transition metal carbides and nitrides and alloying metals selected from the group consisting of the iron metals, chromium, molybdenum and tungsten, in which the aluminum oxide comprises at least 48 weight percent of the composition, the refractory transition metal diborides comprise from 5 to 50 weight percent of the composition, the refractory transition metal carbides and nitrides comprise from 0 to 35 weight percent of the composition, in which said magnesium oxide comprises between 0.3 and 3 weight percent of the composition and the alloying metals comprise from 0 to 6 weight percent of the composition.

2. A composition of material according to claim 1 which is a sintered material with the aluminum oxide and the additional components combined forming two separate, but each continuous interpenetrating skeletons in the sintered structure.

3. A composition of material according to claim 1 in which the refractory transition metal diborides are diborides of a metal selected from the group consisting of titanium, zirconium and hafnium.

4. A composition of material according to claim 1 in which the refractory metal carbides and nitrides are carbides and nitrides of metals selected from the group consisting of titanium, zirconium, hafnium, vanadium, niobium, tantalum, chromium, molybdenum and tungsten.

5. A composition of material according to claim 1 in which the transition metal diborides contain up to 20 weight percent of a diboride of a metal selected from the group consisting of vanadium, niobium, tantalum, chromium, molybdenum, and tungsten, with the balance of the transition metal diboride being a diboride of metal selected from the group consisting of titanium, zirconium and hafnium.

6. The method of forming a composition of material according to claim 1, comprising the steps of:
preparing a mixture of alloy ingredients under inert fluids or gases, until it has uniform consistency and the desired grain size distribution;
compacting the mixture into a desired shape; and
sintering the compacts so formed at temperatures between 1650° C and 1830° C under vacuum or an inert gas atmosphere.

7. The method of forming a composition of material according to claim 1, comprising the steps of:
preparing a mixture of alloy ingredients under inert fluid and gases, until it has uniform consistency and the desired grain size distribution;
pressure-sintering the mixture for 15 to 60 minutes at temperatures between 1650° C and 1830° C; and
shaping the thus formed compact by cutting to the desired shape and size.

8. The method of claim 6 which further comprises the step of affixing a thin plate of the sintered compact to a carbide cutting tool so as to form a composite cutting tool.

9. The method of claim 7 which further comprises the step of affixing a thin plate of the sintered compact to a carbide cutting tool so as to form a composite cutting tool.

* * * * *